US011906002B2

(12) United States Patent
Wheeler

(10) Patent No.: US 11,906,002 B2
(45) Date of Patent: Feb. 20, 2024

(54) APPARATUS AND METHOD FOR A COUPLING ASSEMBLY

(71) Applicant: Telsmith, Inc., Mequon, WI (US)

(72) Inventor: Robert B. Wheeler, Milwaukee, WI (US)

(73) Assignee: Telsmith, Inc., Mequon, WI (US)

( * ) Notice: Subject to any disclaimer, the term of this patent is extended or adjusted under 35 U.S.C. 154(b) by 349 days.

(21) Appl. No.: 17/356,021

(22) Filed: Jun. 23, 2021

(65) Prior Publication Data

US 2021/0396275 A1     Dec. 23, 2021

Related U.S. Application Data

(60) Provisional application No. 63/042,752, filed on Jun. 23, 2020.

(51) Int. Cl.
*F16D 3/26*       (2006.01)
*F16D 3/10*       (2006.01)

(52) U.S. Cl.
CPC ............. *F16D 3/265* (2013.01); *F16D 3/10* (2013.01); *Y10T 403/7016* (2015.01)

(58) Field of Classification Search
CPC ....... F16D 3/265; F16D 3/10; Y10T 403/7016

USPC .................. 464/110, 150, 153; 403/289, 354
See application file for complete search history.

(56) References Cited

U.S. PATENT DOCUMENTS 1,595,942 A   *   8/1926   Jacobs ...................... F16D 3/34
                                                  464/150
6,517,439 B1 *   2/2003   Sears ........................ F16D 3/04

\* cited by examiner

*Primary Examiner* — Greg Binda
(74) *Attorney, Agent, or Firm* — Chambliss, Bahner & Stophel, P.C.; Stephen D. Adams

(57) ABSTRACT

A coupling assembly adapted for use on an item of equipment having a first component and a second component and including an eccentric axis plate having a first surface that is operatively connected to the first component and a second surface having a drive tang extending therefrom, a slider plate having a first surface that is in operational contact with the drive tang and having a first groove therein and a second surface having a second groove therein, and an adapter plate having a first surface that is in operational contact with the slider plate second surface and having an adapter plate tang extending therefrom and a second surface that is operatively connected to the second component. The longitudinal axis of the first component and the longitudinal axis of the second component are non-parallel, and the assembly is adapted to couple the first component and the second component.

20 Claims, 20 Drawing Sheets

APPARATUS AND METHOD FOR A COUPLING ASSEMBLY

CROSS-REFERENCES TO RELATED APPLICATIONS/PATENTS

This application relates back to and claims the benefit of priority from U.S. Provisional Application for Patent Ser. No. 63/042,752 titled "Non-Parallel Axis Coupling" and filed on Jun. 23, 2020.

FIELD OF THE INVENTION

The present invention relates generally to apparatuses and methods for coupling assemblies, and particularly to apparatuses and methods for non-parallel axis coupling assemblies.

BACKGROUND AND DESCRIPTION OF THE PRIOR ART

It is known to use apparatuses and methods to couple rotating components of an item of equipment. Conventional apparatuses and methods, however, suffer from one or more disadvantages. For example, conventional coupling assemblies and methods result in undesirable wear, scuffing, galling, and the like on the components of an item of equipment and the coupling assembly. As a result, conventional coupling assemblies and methods undesirably reduce the durability and lifespan of the item equipment and the coupling assembly and/or undesirably increase the cost of maintenance, repair, and replacement of the item of equipment and the coupling assembly. Conventional coupling assemblies and methods are also undesirably unstable in operation and difficult to install, maintain, repair, and remove from the item of equipment. Further, conventional coupling assemblies and methods are undesirably large and do not prevent undesirable rotation during non-crushing operation. Still further, conventional coupling assemblies and methods do not tolerate high torque levels and/or surface velocities and do not produce constant torque levels between components of the coupling assembly.

Conventional coupling assemblies and methods also do not sufficiently maintain constant contact or reduce surface pressure between the components of the assembly or sufficiently lubricate the components of the assembly. In addition, conventional coupling assemblies and methods are not capable of coupling rotating components having two non-parallel axes, regardless of whether the two non-parallel axes intersect, or rotating components having eccentricity between two or more axes. Conventional coupling assemblies and methods are not capable of being disposed away from the intersection of two non-parallel axes or accommodating different degrees of angular displacement between non-parallel axes. Conventional coupling assemblies and methods are further incapable of accommodating components that rotate, oscillate, and gyrate. Conventional coupling assemblies and methods are still further incapable of maintaining a constant and equal pressure angle between the contacting flanks of the assembly throughout the complete path of rotation, oscillation, and/or gyration. Additionally, conventional coupling assemblies and methods are incapable of controlling the pressure angle between the drive tang and the groove in order to produce sufficient pressure to maintain contact between the coupling components.

It would be desirable, therefore, if an apparatus and method for a coupling assembly could be provided that would not undesirably wear, scuff, or gall the components of an item of equipment or the coupling assembly. It would also be desirable if such an apparatus and method for a coupling assembly could be provided that would not undesirably reduce the durability and lifespan of the item equipment or the coupling assembly and/or undesirably increase the cost of maintenance, repair, and replacement of the item of equipment and the coupling assembly. It would be further desirable if such an apparatus and method for a coupling assembly could be provided that would not be undesirably unstable in operation and difficult to install, maintain, repair, and remove from the item of equipment. It would be still further desirable if such an apparatus and method for a coupling assembly could be provided that would not be undesirably large or permit undesirable rotation during non-crushing operation. In addition, it would be desirable if such an apparatus and method for a coupling assembly could be provided that would tolerate high torque levels and/or surface velocities and produce constant torque levels between components of the coupling assembly. It would also be desirable if such an apparatus and method for a coupling assembly could be provided that would maintain constant contact and reduce surface pressure between the components of the assembly and sufficiently lubricate the components of the assembly. Further, it would be desirable if such an apparatus and method for a coupling assembly could be provided that would be capable of coupling rotating components having non-parallel axes, regardless of whether the non-parallel axes intersect, and/or rotating components having eccentricity between two or more axes. Still further, it would be desirable if such an apparatus and method could be provided that could be disposed away from the intersection of two non-parallel axes and/or accommodate different degrees of angular displacement between non-parallel axes. In addition, it would be desirable if such an apparatus and method for a coupling assembly could be provided that would be capable of accommodating components that rotate, oscillate, and/or gyrate. It would also be desirable if such an apparatus and method for a coupling assembly could be provided that would be capable of maintaining a constant and equal pressure angle between the contacting flanks of the assembly throughout the complete path of rotation, oscillation, and/or gyration. Further, it would be desirable if such an apparatus and method for a coupling assembly could be provided that would be capable of controlling the pressure angle between a drive tang and a groove in order to produce sufficient pressure to maintain contact between the coupling components.

Advantages of the Preferred Embodiments of the Invention

Accordingly, it is an advantage of the preferred embodiments of the invention claimed herein to provide an apparatus and method for a coupling assembly that does not undesirably wear, scuff, or gall the components of an item of equipment or the coupling assembly. It is also an advantage of the preferred embodiments of the invention claimed herein to provide an apparatus and method for a coupling assembly that does not undesirably reduce the durability and lifespan of the item equipment or the coupling assembly and/or undesirably increase the cost of maintenance, repair, and replacement of the item of equipment and the coupling assembly. It is another advantage of the preferred embodiments of the invention claimed herein to provide an apparatus and method for a coupling assembly that is not undesirably unstable in operation or difficult to install, maintain, repair, and remove from the item of equipment. It is still another advantage of the preferred embodiments of the invention claimed herein to provide an apparatus and method for a coupling assembly that is not undesirably large and does not permit undesirable rotation during non-crushing operation. It is yet another advantage of the preferred embodiments of the invention claimed herein to provide an apparatus and method for a coupling assembly that tolerates high torque levels and/or surface velocities and produces constant torque levels between components of the coupling assembly. In addition, it is an advantage of the preferred embodiments of the invention claimed herein to provide an apparatus and method for a coupling assembly that maintains constant contact and reduces surface pressure between the components of the assembly and sufficiently lubricates the components of the assembly. It is an additional advantage of the preferred embodiments of the invention claimed herein to provide an apparatus and method for a coupling assembly that is capable of coupling rotating components having non-parallel axes, regardless of whether the non-parallel axes intersect, and/or rotating components having eccentricity between two or more axes. It is also an advantage of the preferred embodiments of the invention claimed herein to provide an apparatus and method for a coupling assembly that may be disposed away from the intersection of two non-parallel axes and accommodate different degrees of angular displacement between non-parallel axes. It is another advantage of the preferred embodiments of the invention claimed herein to provide an apparatus and method for a coupling assembly that is adapted to accommodate components that rotate, oscillate, and/or gyrate. It is still another advantage of the preferred embodiments of the invention claimed herein to provide an apparatus and method for a coupling assembly that maintains a constant and equal pressure angle between the contacting flanks of the assembly throughout the complete path of rotation, oscillation, and/or gyration. Further, it is an advantage of the preferred embodiments of the invention to provide an apparatus and method for a coupling assembly that controls the pressure angle between a drive tang and a groove in order to produce sufficient pressure to maintain contact between the coupling components.

Additional advantages of the preferred embodiments of the invention will become apparent from an examination of the drawings and the ensuing description.

EXPLANATION OF THE TECHNICAL TERMS

The use of the terms "a," "an," "the," and similar terms in the context of describing the invention are to be construed to cover both the singular and the plural, unless otherwise indicated herein or clearly contradicted by context. The terms "comprising" "having," "including," and "containing" are to be construed as open-ended terms (i.e., meaning "including, but not limited to,") unless otherwise noted. The terms "substantially," "generally," and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic. All methods described herein can be performed in any suitable order unless otherwise specified herein or clearly indicated by context.

Terms concerning attachments, coupling and the like, such as "attached," "connected," and "interconnected," refer to a relationship wherein structures are secured or attached to one another either directly or indirectly through intervening structures, as well as both moveable and rigid attachments or relationships, unless specified herein or clearly indicated by context. The term "operatively connected" is such an attachment, coupling or connection that allows the pertinent structures to operate as intended by virtue of that relationship.

The use of any and all examples or exemplary language (e.g., "such as," "preferred," and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

SUMMARY OF THE INVENTION

The apparatus of the invention comprises a coupling assembly adapted for use on an item of equipment having a first component and a second component. The preferred coupling assembly comprises an eccentric axis plate having an eccentric axis plate first surface that is operatively connected to the first component of the item of equipment and an eccentric axis plate second surface that is spaced apart from the eccentric axis plate first surface and has a drive tang extending therefrom. The preferred coupling assembly also comprises a slider plate having a slider plate first surface that is in operational contact with the drive tang of the eccentric axis plate second surface and has a first groove therein and a slider plate second surface that is spaced apart from the slider plate first surface and has a second groove therein. The preferred coupling assembly further comprises an adapter plate having an adapter plate first surface that is in operational contact with the slider plate second surface and has an adapter plate tang extending therefrom and an adapter plate second surface that is spaced apart from the adapter plate first surface and operatively connected to the second component of the item of equipment. In the preferred coupling assembly, the first component has a first longitudinal axis, the second component has a second longitudinal axis, and the first longitudinal axis and the second longitudinal axis are non-parallel. Also in the preferred coupling assembly, the coupling assembly is adapted to couple the first component and the second component of the item of equipment.

The method of the invention comprises a method for coupling a first component and a second component of an item of equipment. The preferred method comprises providing a coupling assembly adapted for use on an item of equipment having a first component and a second component. The preferred coupling assembly comprises an eccentric axis plate having an eccentric axis plate first surface that is operatively connected to the first component of the item of equipment and an eccentric axis plate second surface that is spaced apart from the eccentric axis plate first surface and has a drive tang extending therefrom. The preferred coupling assembly also comprises a slider plate having a slider plate first surface that is in operational contact with the drive tang of the eccentric axis plate second surface and has a first groove therein and a slider plate second surface that is spaced apart from the slider plate first surface and has a second groove therein. The preferred coupling assembly further comprises an adapter plate having an adapter plate first surface that is in operational contact with the slider plate second surface and has an adapter plate tang extending therefrom and an adapter plate second surface that is spaced apart from the adapter plate first surface and operatively connected to the second component of the item of equipment. In the preferred coupling assembly, the first component has a first longitudinal axis, the second component has a second longitudinal axis, and the first longitudinal axis and the second longitudinal axis are non-parallel. Also in the preferred coupling assembly, the coupling assembly is adapted to couple the first component and the second component of the item of equipment. The preferred method further comprises rotating the first component and the second component of the item of equipment.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED
EMBODIMENTS OF THE INVENTION

Figure 1:
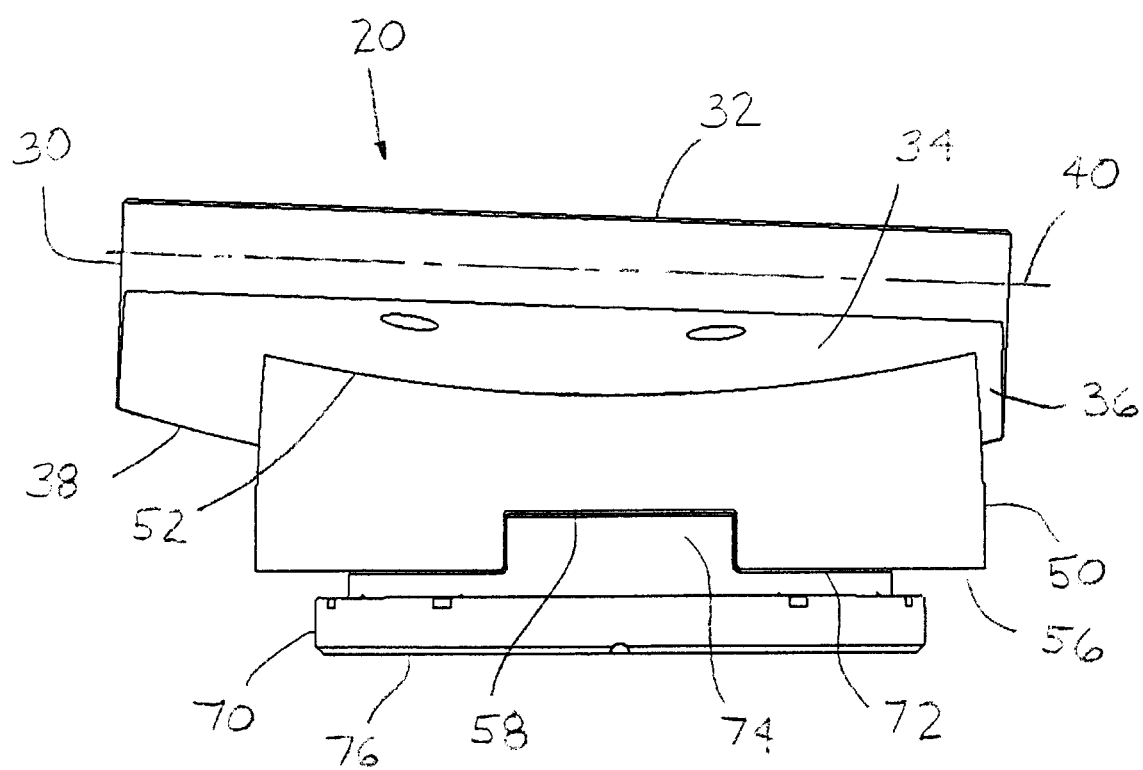
FIG. 1 is a front view of the preferred coupling assembly illustrating the eccentric axis plate disposed in a left side position and the slider plate disposed in a centered position in accordance with the present invention.

Referring now to the drawings, the preferred embodiment of the coupling assembly in accordance with the present invention is illustrated by FIGS. 1 through 21. Referring now to FIG. 1, a front view of the preferred coupling assembly is illustrated with the eccentric axis plate disposed in a left side position and the slider plate disposed in a centered position. As shown in FIG. 1, the preferred coupling assembly is designated generally by reference numeral 20. Preferred coupling assembly 20 comprises eccentric axis plate 30 having an eccentric axis plate first surface such as top surface 32, an eccentric axis plate second surface such as bottom surface 34 that is spaced apart from the eccentric axis plate first surface and has eccentric axis plate drive tang 36 extending therefrom. Preferred eccentric axis plate second surface 34 is arcuate. Preferably, eccentric axis plate 30 comprises an arcuate drive tang contacting surface 38 that is an involute curve. Preferred eccentric axis plate 30 is adapted to rotate and gyrate. In addition, preferred eccentric axis plate 30 has eccentric axis plate lateral axis 40.

Figure 2:
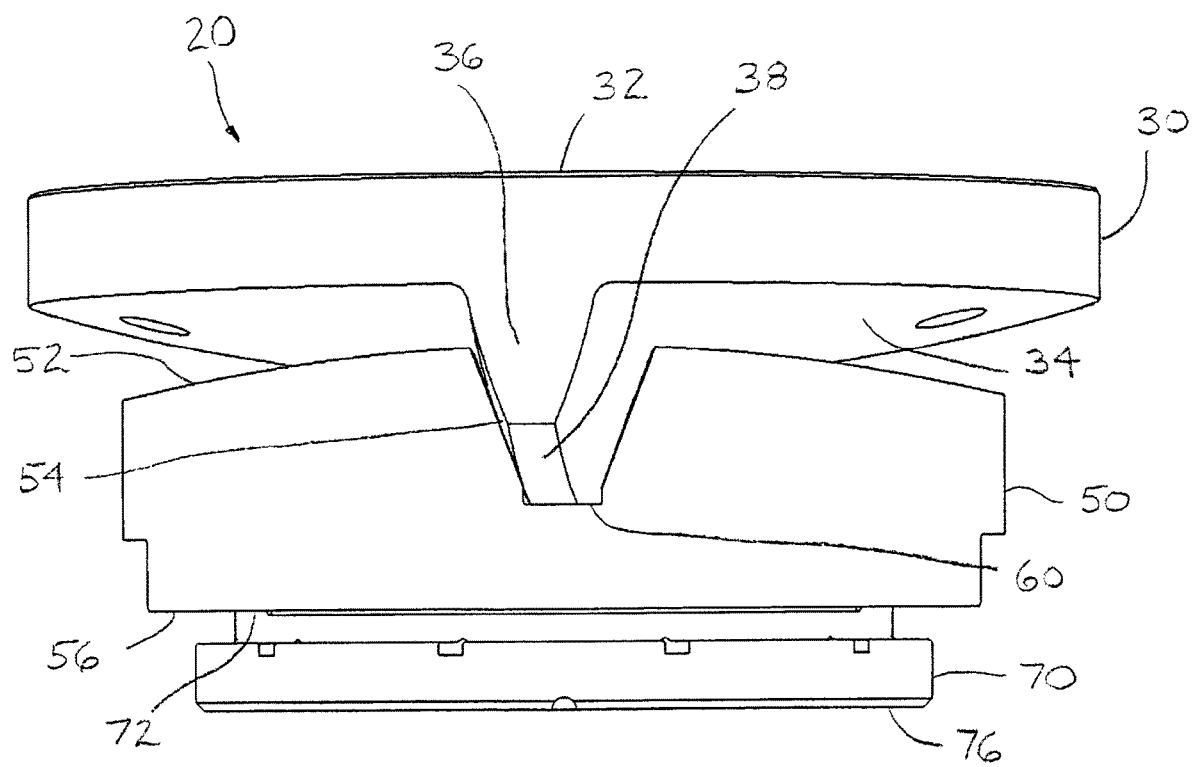
FIG. 2 is a left side view of the preferred coupling assembly illustrated in FIG. 1.

Still referring to FIG. 1, preferred coupling assembly 20 also comprises slider plate 50 having a slider plate first surface such as top surface 52 that is in operational contact with drive tang 36 of eccentric axis plate second surface (or bottom surface) 34 and a slider plate first groove such as top groove 54 therein (see, e.g., FIG. 2). Preferably, slider plate top surface 52 is arcuate. Preferred slider plate 50 also comprises a slider plate second surface such as bottom surface 56 that is spaced apart from slider plate top surface 52 and has a slider plate second groove such as bottom groove 58 therein. Preferably, slider plate 50 is adapted to oscillate and rotate. Preferred drive tang 36 of eccentric axis plate 30 extends laterally beyond top groove 54 of slider plate 50.

Still referring to FIG. 1, preferred coupling assembly 20 further comprises adapter plate 70 having an adapter plate first surface such as top surface 72 that is in operational contact with slider plate bottom surface 56 and has adapter plate tang 74 extending therefrom. Preferred adapter plate 70 also comprises an adapter plate second surface such as bottom surface 76 that is spaced apart from adapter plate top surface 72. Preferably, adapter plate 70 is adapted to rotate. More particularly, preferred adapter plate 70 is adapted to axially rotate about the primary or machine axis without any radial, tangential, or eccentric displacement.

Still referring to FIG. 1, preferred eccentric axis plate 30 is adapted to slidingly move relative to slider plate 50 between an extreme left position, a centered position, and an extreme right position along eccentric axis plate lateral axis 40. Also in preferred coupling assembly 20, slider plate 50 maintains substantially constant contact with adapter plate 70 during operations.

While FIG. 1 illustrates the preferred configuration and arrangement of the coupling assembly in accordance with the present invention, it is contemplated within the scope of the invention that the coupling assembly may be of any suitable configuration and arrangement. For example, it is contemplated within the scope of the invention that the eccentric axis plate may comprise and groove instead of a drive tang and the slider plate may include a tang instead of a top groove. It is also contemplated within the scope of the invention that the adapter plate may comprise a groove instead of a tang and the slider plate may include a tang instead of a bottom groove.

Referring now to FIG. 2, a left side view of preferred coupling assembly 20 is illustrated. As shown in FIG. 2, preferred coupling assembly 20 comprises eccentric axis plate 30, eccentric axis plate top surface 32, eccentric axis plate bottom surface 34, drive tang 36, drive tang contacting surface 38, slider plate 50, slider plate top surface 52, slider plate top groove 54, slider plate bottom surface 56, slider plate top groove contacting surface 60, adapter plate 70, adapter plate top surface 72, and adapter plate bottom surface 76. As shown in FIG. 2, preferred drive tang 36 has a pair of substantially vertical sides or flanks that are sloped or tapered, and arcuate drive tang contacting surface 38 is an involute curve. As also shown in FIG. 2, slider plate top groove 54 has a pair of substantially vertical sides or flanks that are sloped or tapered. As further shown in FIG. 2, when preferred eccentric axis plate 30 is disposed in the extreme left position (or the extreme right position) relative to slider plate 50, the slider plate is disposed in the middle position relative to adapter plate 70. Preferably, slider plate 50 slidingly moves relative to adapter plate 70 between an extreme forward position, a middle position, and an extreme rearward position along slider plate lateral axis 78.

Figure 3:
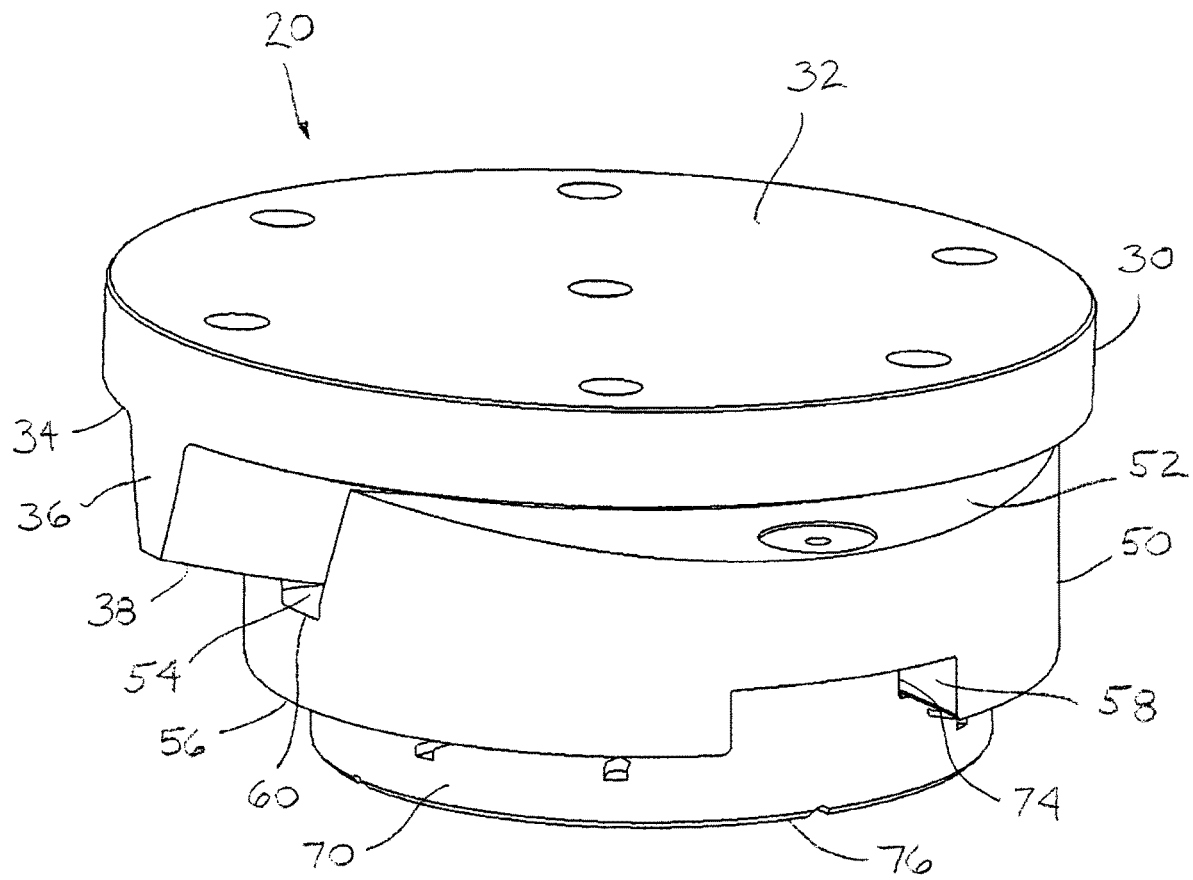
FIG. 3 is a front left perspective view of the preferred coupling assembly illustrated in FIGS. 1-2.

Referring now to FIG. 3, a front left perspective view of preferred coupling assembly 20 is illustrated. As shown in FIG. 3, preferred coupling assembly 20 comprises eccentric axis plate 30, eccentric axis plate top surface 32, eccentric axis plate bottom surface 34, drive tang 36, drive tang contacting surface 38, slider plate 50, slider plate top surface 52, slider plate top groove 54, slider plate bottom surface 56, slider plate bottom groove 58, slider plate top groove contacting surface 60, adapter plate 70, adapter plate tang 74, and adapter plate bottom surface 76.

Figure 4:
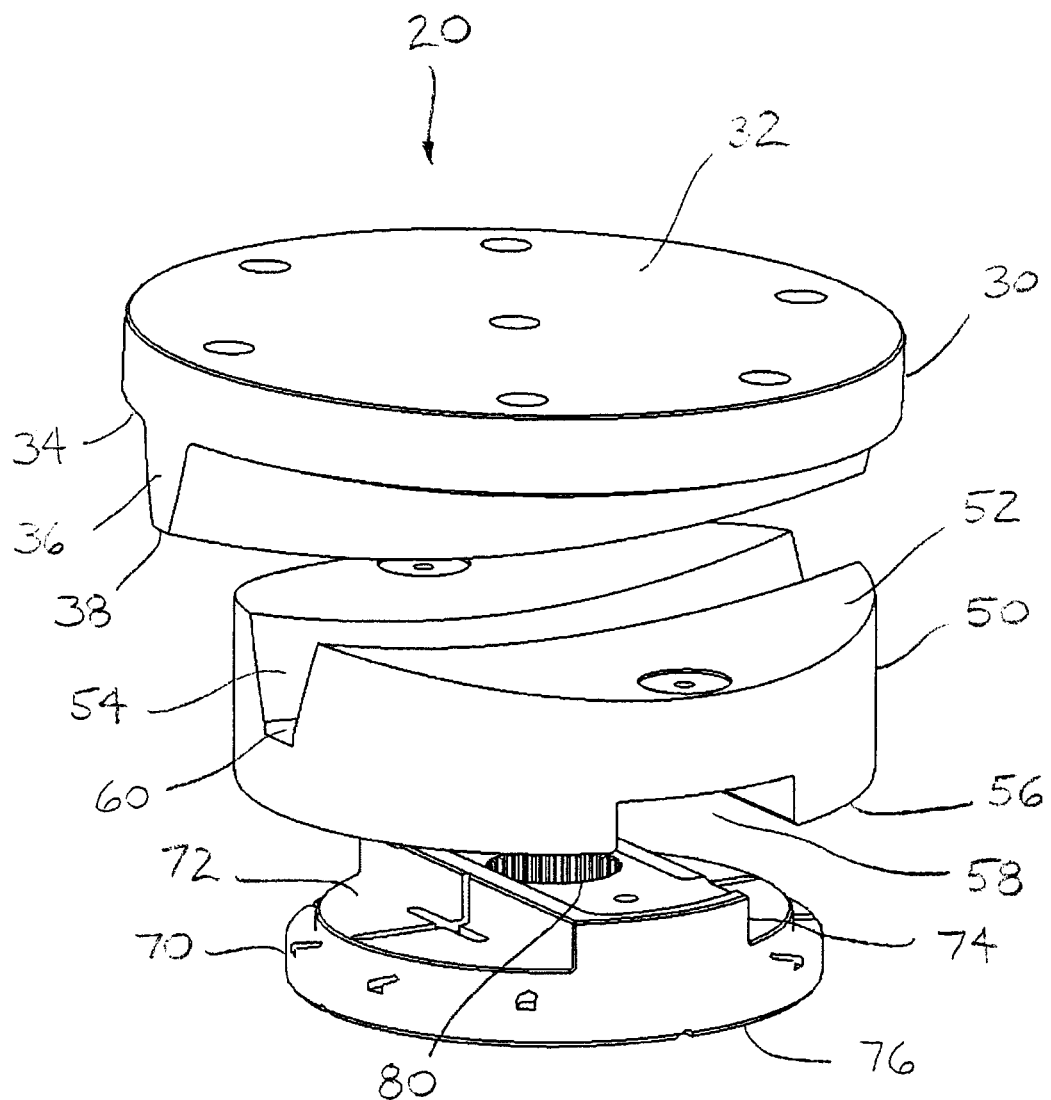
FIG. 4 is an exploded front left perspective view of the preferred coupling assembly illustrated in FIGS. 1-3.

Referring now to FIG. 4, an exploded front left perspective view of preferred coupling assembly 20 is illustrated. As shown in FIG. 4, preferred coupling assembly 20 comprises eccentric axis plate 30, eccentric axis plate top surface 32, eccentric axis plate bottom surface 34, drive tang 36, drive tang contacting surface 38, slider plate 50, slider plate top surface 52, slider plate top groove 54, slider plate bottom surface 56, slider plate bottom groove 58, slider plate top groove contacting surface 60, adapter plate 70, adapter plate top surface 72, adapter plate tang 74, and adapter plate bottom surface 76. As shown in FIG. 4, preferred adapter plate 70 also comprises one or more adapter plate openings 80 adapted to receive fluid (see also, FIG. 17).

Figure 5:
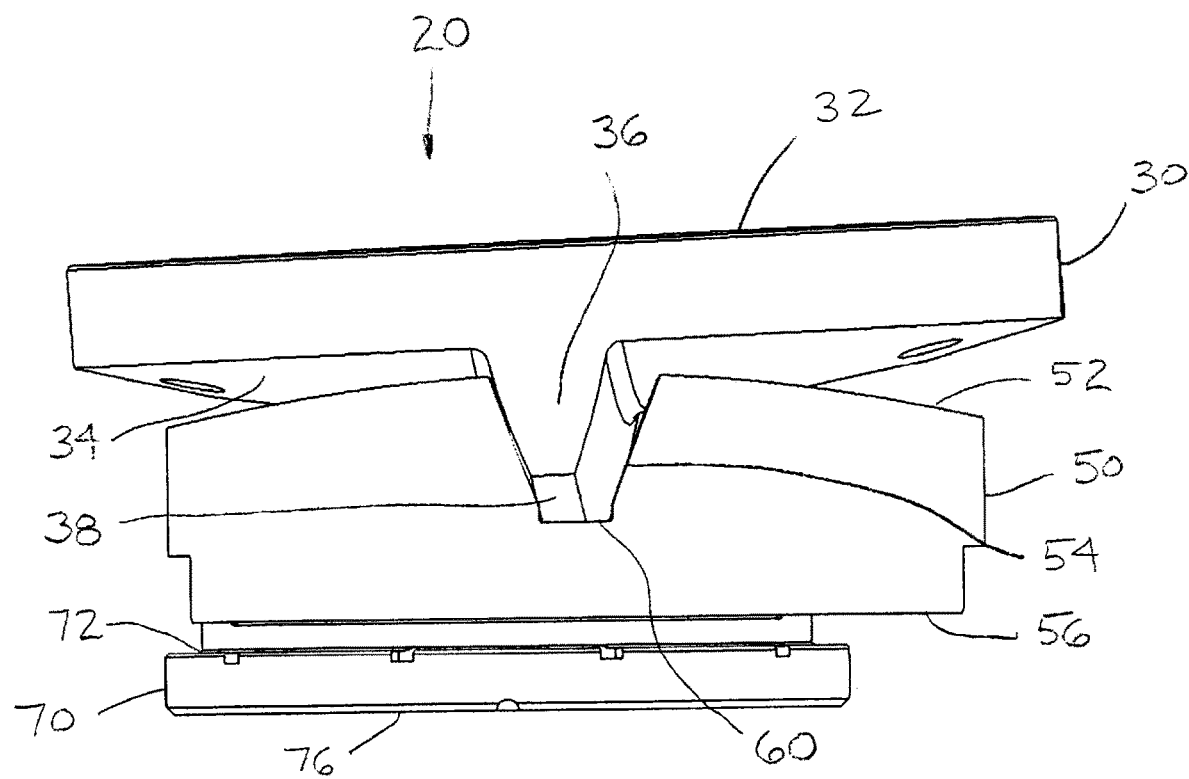
FIG. 5 is a back side view of the preferred coupling assembly illustrated in FIGS. 1-4 showing the assembly at a rotated position 90 degrees relative to FIGS. 1-4 with the eccentric axis plate in a centered position and the slider plate disposed in a left position.

Referring now to FIG. 5, a back side view of preferred coupling assembly 20 is illustrated showing the assembly at a rotated position 90 degrees relative to FIGS. 1-4 with eccentric axis plate 30 in a centered position and slider plate 50 disposed in a left position. As shown in FIG. 5, preferred coupling assembly 20 comprises eccentric axis plate 30, eccentric axis plate top surface 32, eccentric axis plate bottom surface 34, drive tang 36, drive tang contacting surface 38, slider plate 50, slider plate top surface 52, slider plate top groove 54, slider plate bottom surface 56, slider plate top groove contacting surface 60, adapter plate 70, adapter plate top surface 72, and adapter plate bottom surface 76.

Figure 6:
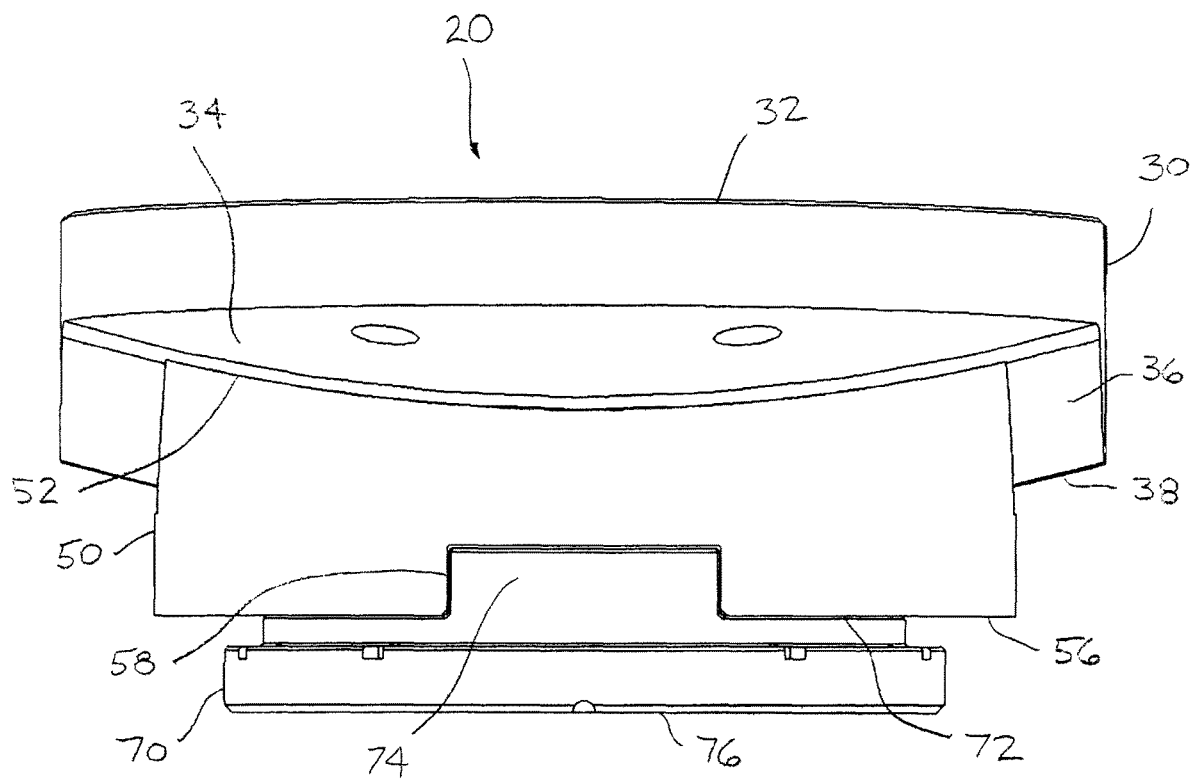
FIG. 6 is a front view of the preferred coupling assembly illustrated in FIGS. 1-5 showing the eccentric axis plate disposed in a right side position and the slider plate disposed in a centered position.

Referring now to FIG. 6, a front view of preferred coupling assembly 20 is illustrated showing eccentric axis plate 30 disposed in a centered position relative to slider plate 50. As shown in FIG. 6, preferred coupling assembly 20 comprises eccentric axis plate 30, eccentric axis plate top surface 32, eccentric axis plate bottom surface 34, drive tang 36, drive tang contacting surface 38, slider plate 50, slider plate top surface 52, slider plate bottom surface 56, slider plate bottom groove 58, adapter plate 70, adapter plate top surface 72, adapter plate tang 74, and adapter plate bottom surface 76.

Figure 7:
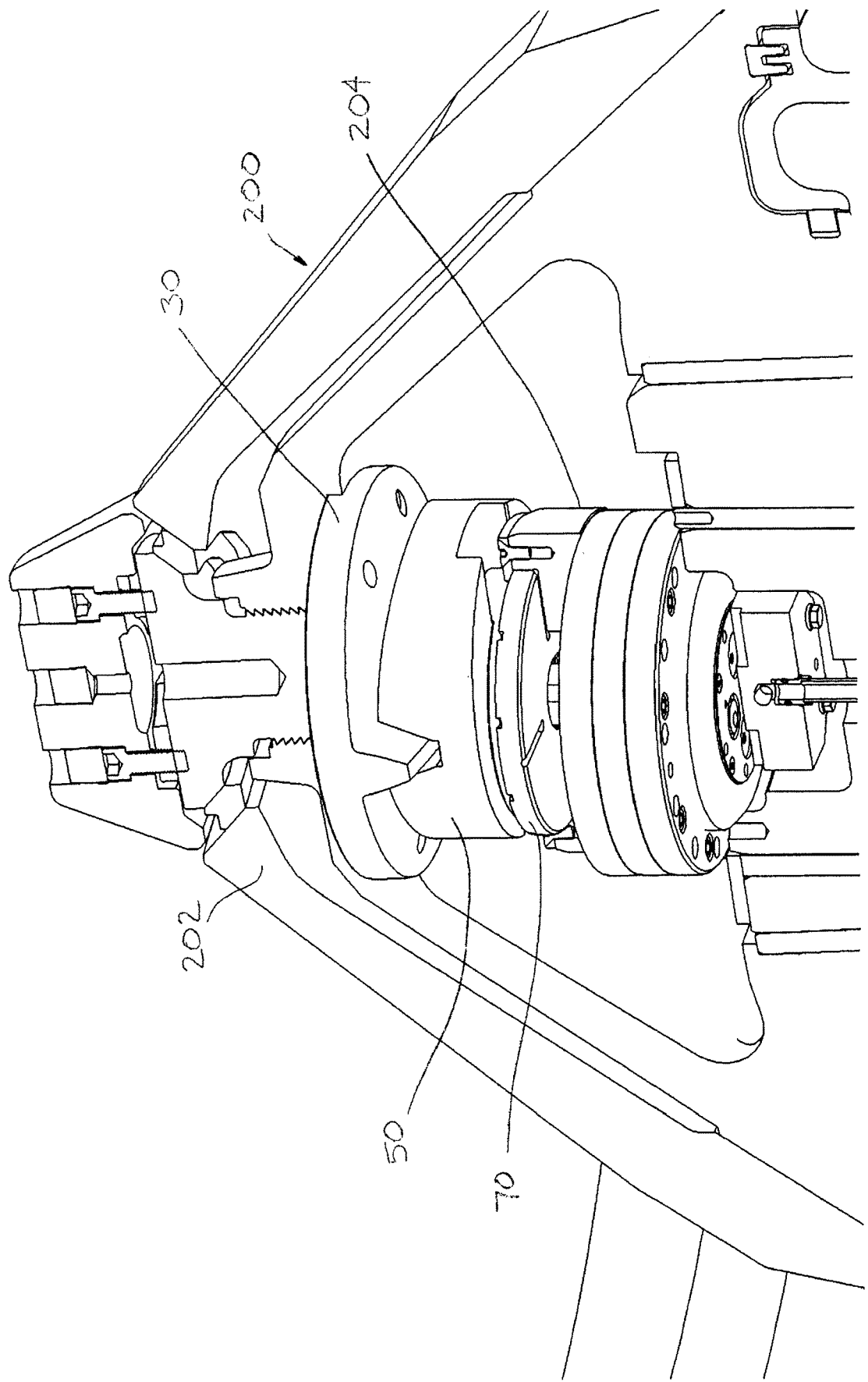
FIG. 7 is a perspective view of the preferred coupling assembly illustrated in FIGS. 1-6 showing the assembly mounted on a rock crusher and rotated 90 degrees with the eccentric axis plate in a centered position and the slider plate in a forward position.

Referring now to FIG. 7, a perspective view of the preferred coupling assembly 20 is illustrated showing the assembly mounted on a rock crusher and rotated 90 degrees with eccentric axis plate 30 disposed in a centered position relative to slider plate 50 and the slider plate disposed in a forward position relative to adapter plate 70. As shown in FIG. 7, when preferred eccentric axis plate 30 is in a centered position relative to slider plate 50, the slider plate is in an extreme forward (or rearward) position. Further, as shown in FIG. 7, exemplary item of equipment such as gyratory cone rock crusher 200 includes a first component or upper rotating shaft such as head 202 and a second component or lower rotating shaft such as main shaft 204. Preferred head 202 has a first longitudinal axis and is operatively connected to eccentric axis plate 30. Preferred main shaft 204 has a second longitudinal axis and is operatively connected to adapter plate 70. Preferably, first longitudinal axis and the second longitudinal axis are non-parallel (see, e.g., FIGS. 11 and 12), and coupling assembly 20 is adapted to couple the first component and the second component of the item of equipment.

Figure 8:
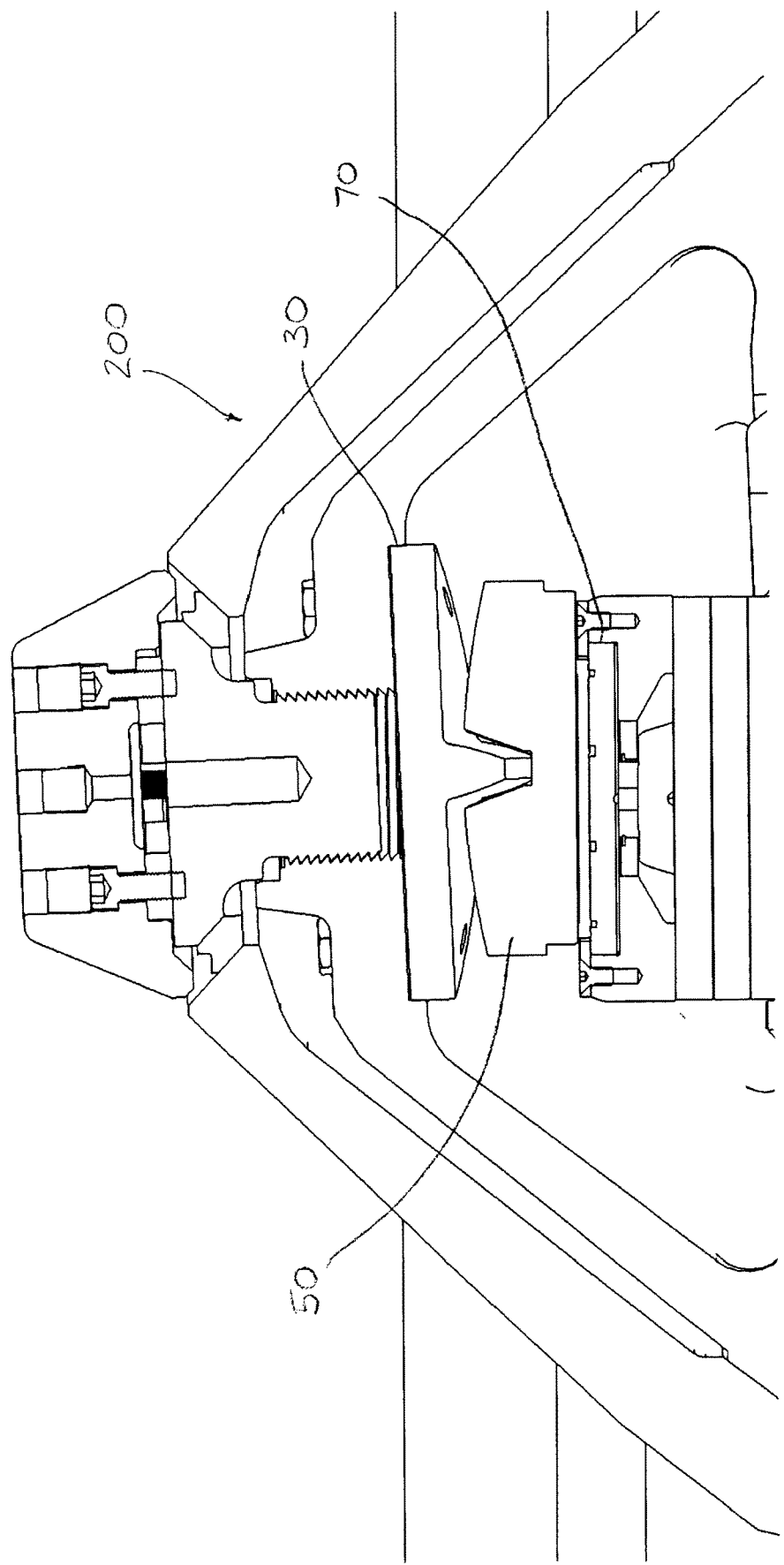
FIG. 8 is a perspective view of the preferred coupling assembly illustrated in FIGS. 1-7 showing the assembly mounted on a rock crusher and rotated 90 degrees with the eccentric axis plate in a centered position and the slider plate in a rearward position.

Referring now to FIG. 8, a perspective view of preferred coupling assembly 20 is illustrated showing the assembly mounted on rock crusher 200 and rotated 90 degrees with eccentric axis plate 30 in a centered position and slider plate 50 in a rearward position. As shown in FIG. 8, when preferred eccentric axis plate 30 is in a centered position relative to slider plate 50, the slider plate is in an extreme rearward (or forward) position relative to adapter plate 70.

Figure 9:
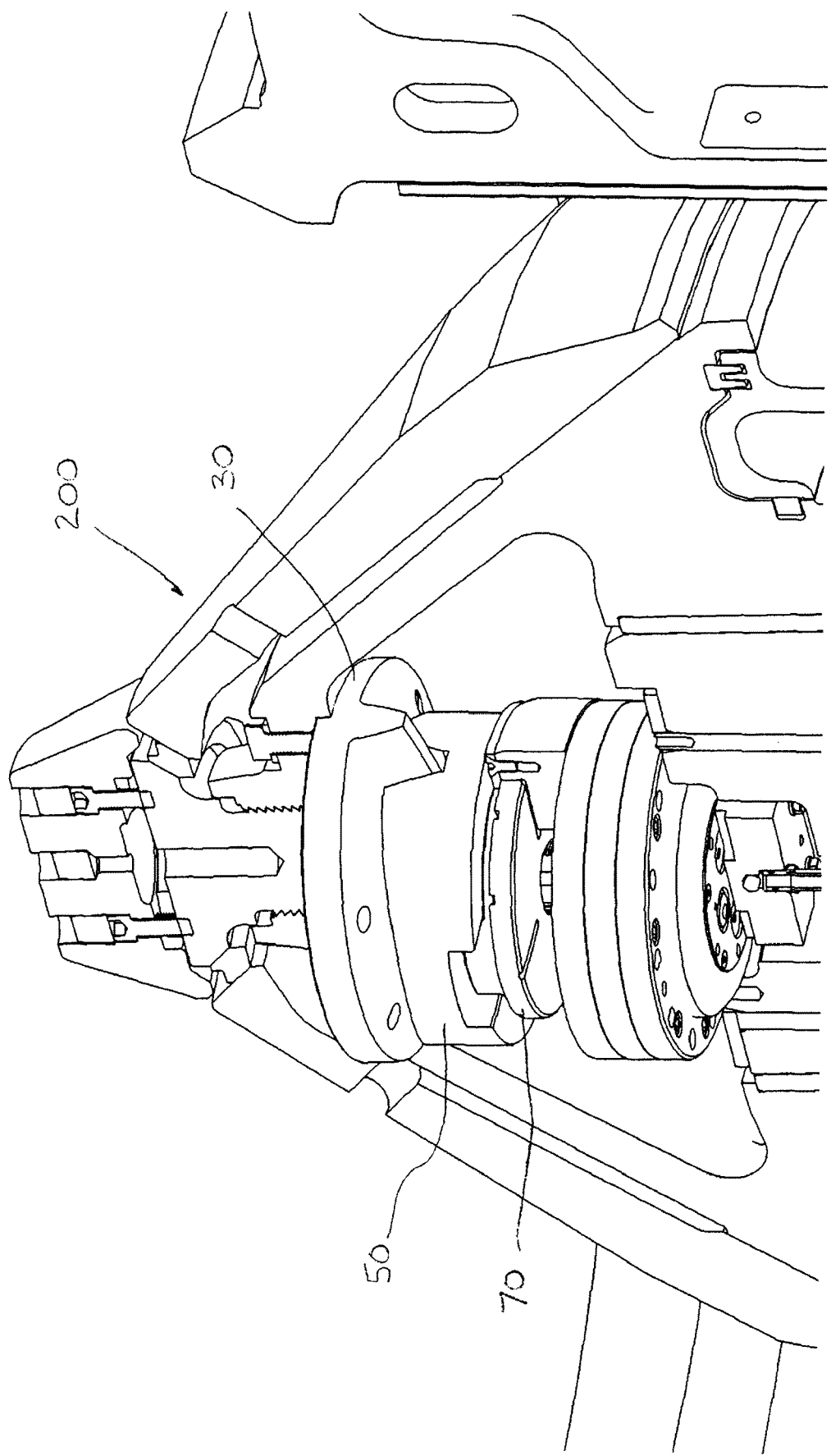
FIG. 9 is a perspective view of the preferred coupling assembly illustrated in FIGS. 1-8 showing the assembly mounted on a rock crusher and rotated 270 degrees with the eccentric axis plate in a right position and the slider plate in a centered position.

Referring now to FIG. 9, a perspective view of preferred coupling assembly 20 is illustrated showing the assembly mounted on rock crusher 200 and rotated 270 degrees with eccentric axis plate 30 in a right position and slider plate 50 in a centered position. As shown in FIG. 9, when preferred eccentric axis plate 30 is in an extreme right (or left) position relative to slider plate 50, the slider plate is in a centered position relative to adapter plate 70.

Figure 10:
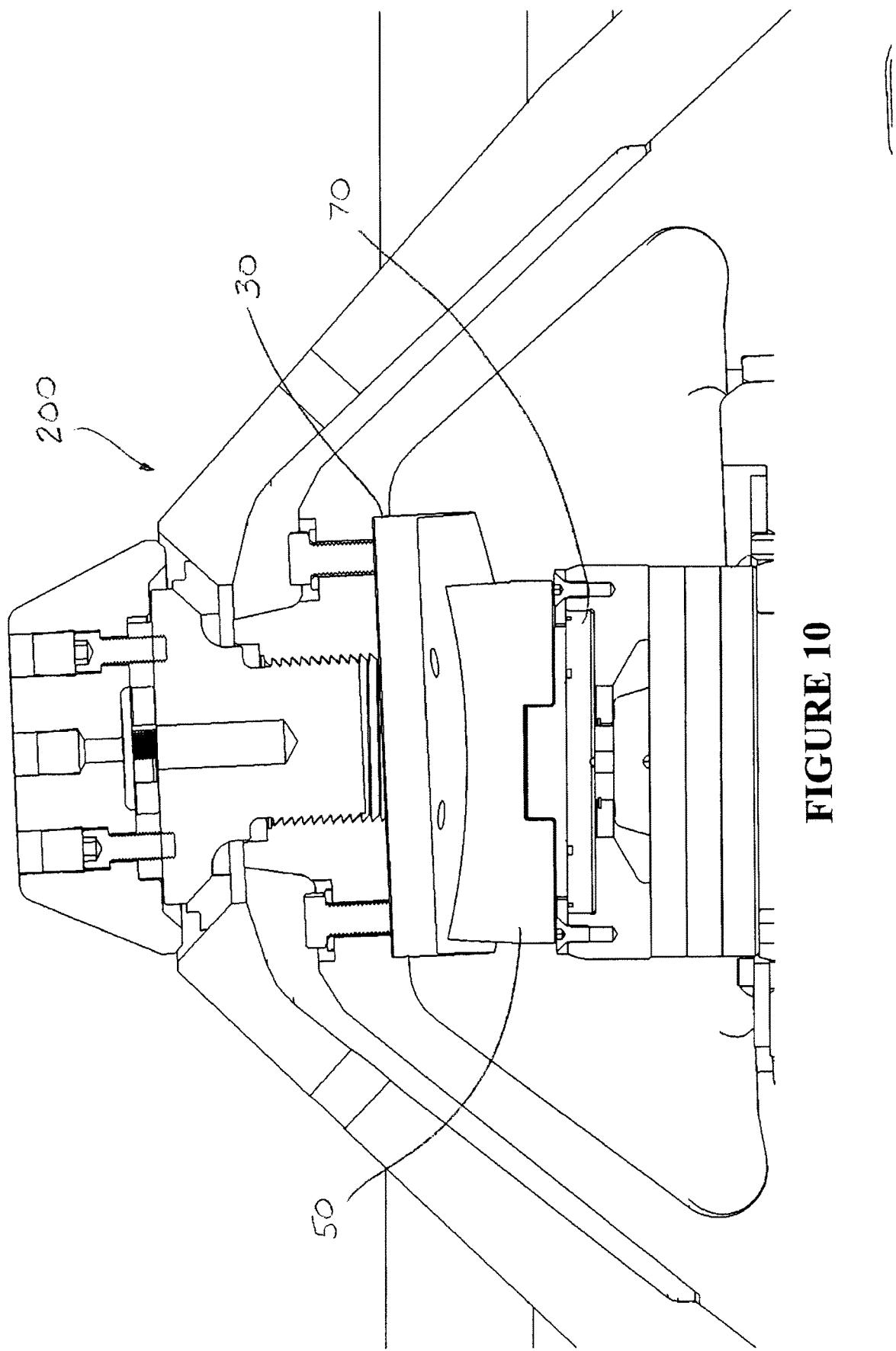
FIG. 10 is a back view of the preferred coupling assembly illustrated in FIGS. 1-9 showing the assembly mounted on a rock crusher with the eccentric axis plate in a left position and the slider plate in a centered position.

Referring now to FIG. 10, a back view of preferred coupling assembly 20 is illustrated showing the assembly mounted on rock crusher 200 with eccentric axis plate 30 in a left position and slider plate 50 in a centered position. As shown in FIG. 10, when preferred eccentric axis plate 30 is in an extreme left (or right) position relative to slider plate 50, the slider plate is in a centered position.

Figure 11:
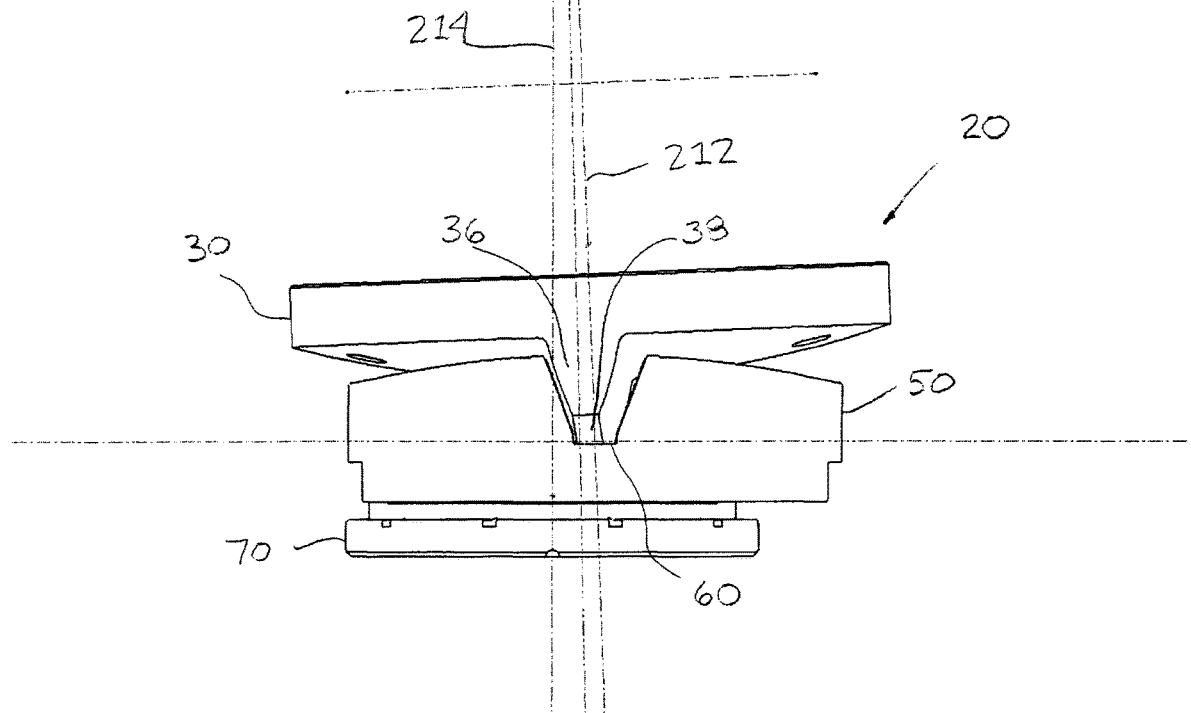
FIG. 11 is a back view of the preferred coupling assembly illustrated in FIGS. 1-10 showing the non-parallel first and second longitudinal axes.

Referring now to FIG. 11, a back view of preferred coupling assembly 20 as substantially shown in FIG. 5 is illustrated. As shown in FIG. 11, preferred coupling assembly 20 is adapted to couple two components of an item of equipment wherein the two components have non-parallel longitudinal axes. More particularly, preferred coupling assembly 20 is adapted to couple a first component of an item of equipment such as an upper rotating component or head having first longitudinal axis 212 and a second component of the item of equipment such as a lower rotating component or main shaft having second longitudinal axis 214. As shown in FIG. 11, first longitudinal axis 212 and second longitudinal axis 214 are non-parallel and intersect at intersection 220. Preferably, the involute curve of the arcuate contacting surface 38 of drive tang 36 and the involute curve of the arcuate top groove contacting surface 60 of slider plate 50 are concentric to intersection 220. As also shown in FIG. 11, preferred eccentric axis plate 30 is concentric to first longitudinal axis 212 and preferred adapter plate is concentric to second longitudinal axis 214.

Figure 12:
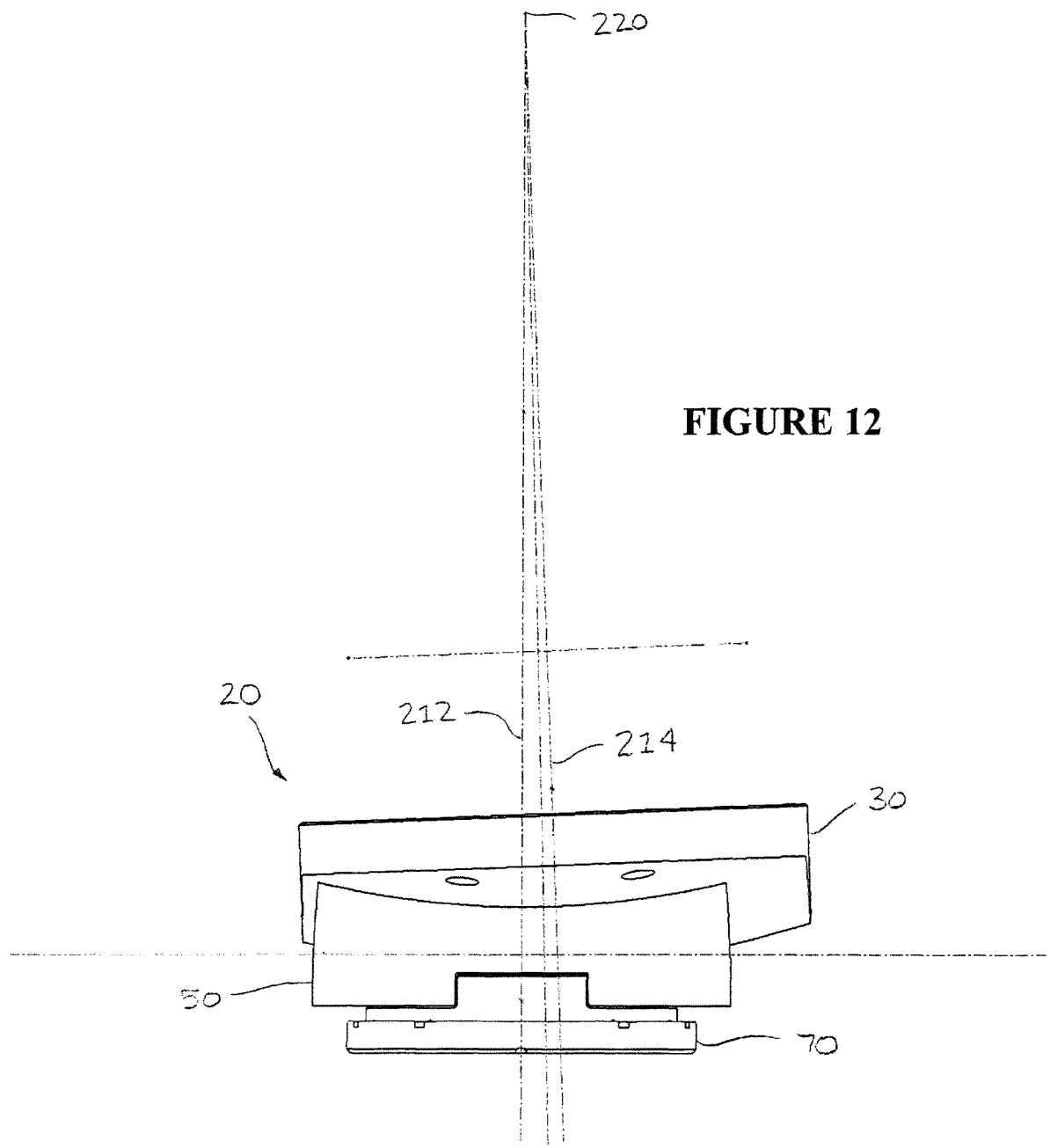
FIG. 12 is a front view of the preferred coupling assembly illustrated in FIGS. 1-11 showing the non-parallel first and second longitudinal axes.

Referring now to FIG. 12, a front view of preferred coupling assembly 20 is illustrated with eccentric axis plate 30 disposed in a right side position and slider plate 50 disposed in a centered position. As shown in FIG. 12, first longitudinal axis 212 and second longitudinal axis 214 are non-parallel and intersect at intersection 220.

Figure 13:
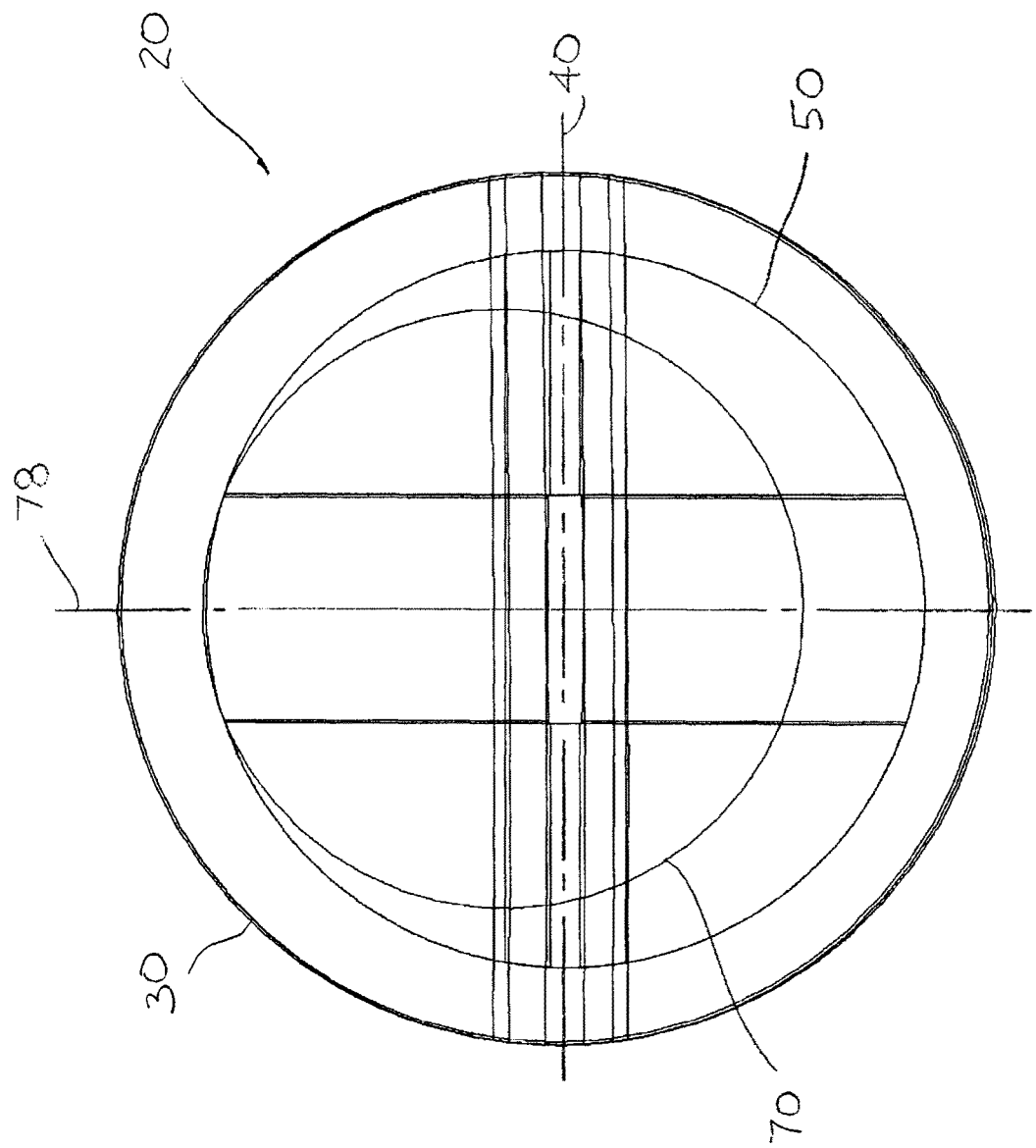
FIG. 13 is a top view of the preferred coupling assembly illustrated in FIGS. 1-12 showing the assembly with the eccentric axis plate in a centered position and the slider plate in a left position.

Referring now to FIG. 13, a top view of preferred coupling assembly 20 is illustrated showing the assembly with eccentric axis plate 30 in a centered position relative to slider plate 50 and the slider plate in a forward position relative to adapter plate 70 (see, e.g., FIG. 6). As shown in FIG. 13, the eccentric axis plate lateral axis 40 is substantially perpendicular to the slider plate lateral axis 78.

Figure 14:
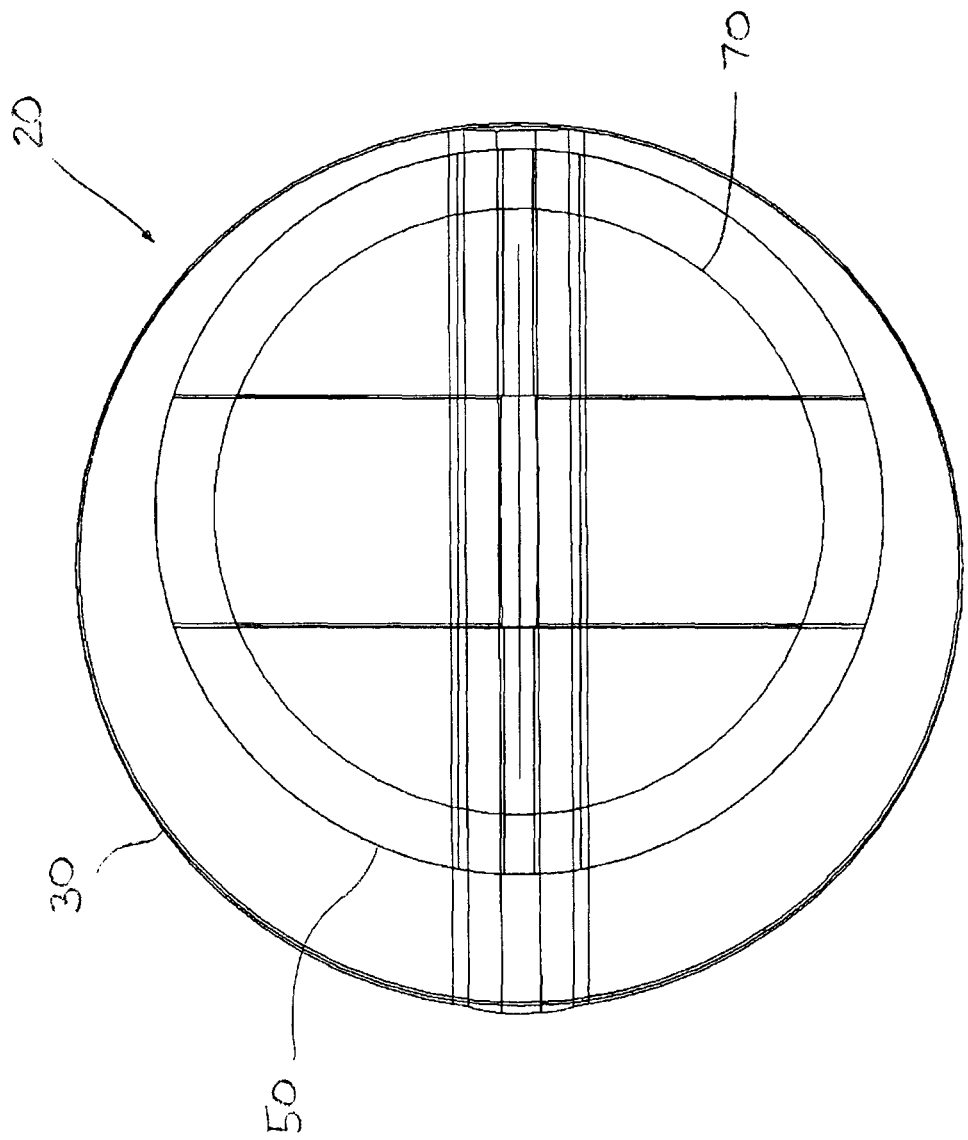
FIG. 14 is a top view of the preferred coupling assembly illustrated in FIGS. 1-13 showing the assembly with the eccentric axis plate in a left position and the slider plate in a centered position.

Referring now to FIG. 14, a top view of preferred coupling assembly 20 is illustrated showing the assembly with eccentric axis plate 30 in a left position relative to slider plate 50 and the slider plate in a centered position relative to adapter plate 70.

Figure 15:
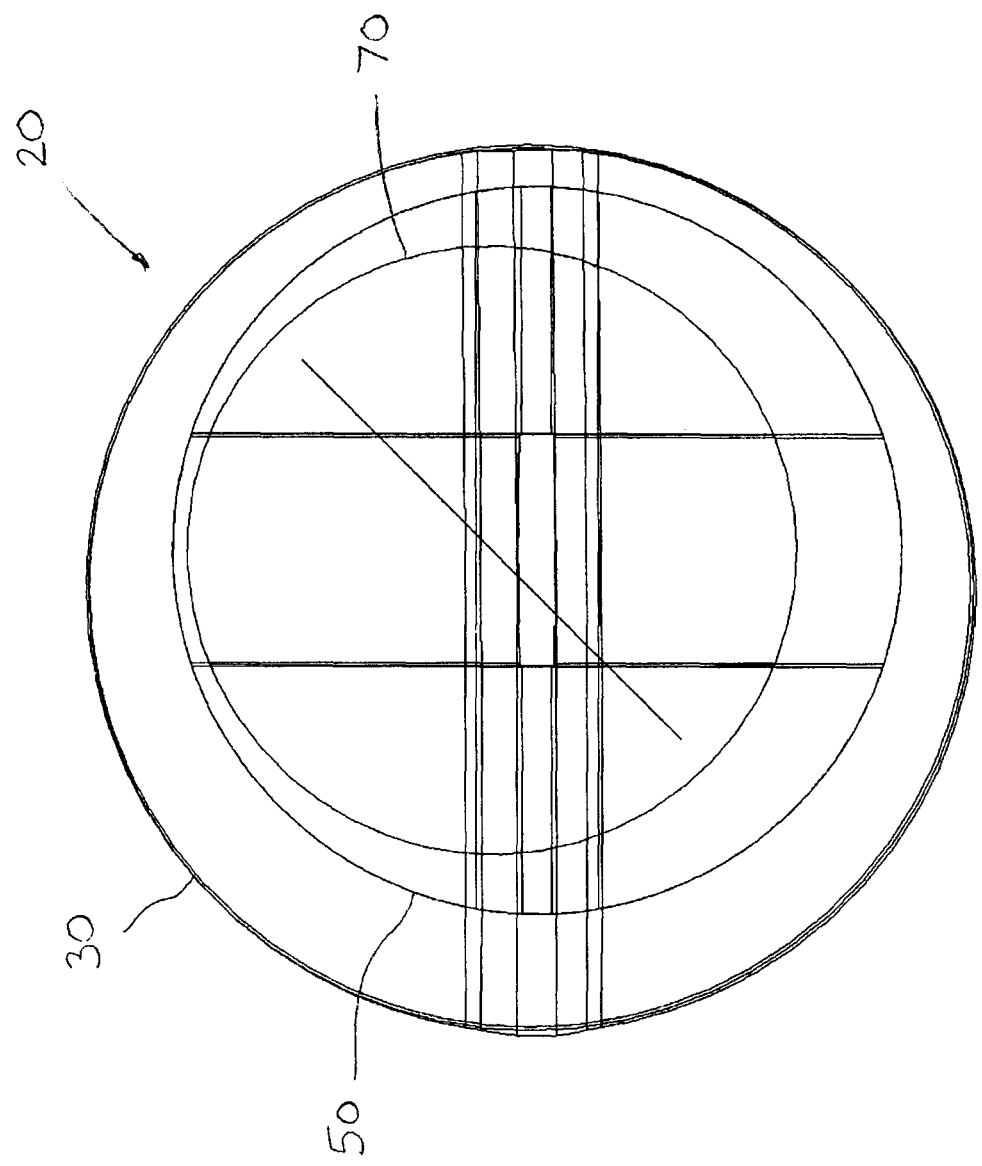
FIG. 15 is a top view of the preferred coupling assembly illustrated in FIGS. 1-14 showing the assembly rotated 45 degrees with the eccentric axis plate in a partially left position and the slider plate in a partially forward position.

Referring now to FIG. 15, a top view of preferred coupling assembly 20 is illustrated showing the assembly rotated 45 degrees with eccentric axis plate 30 in a partially left position relative to slider plate 50 and the slider plate disposed in a partially forward position relative to adapter plate 70.

Figure 16:
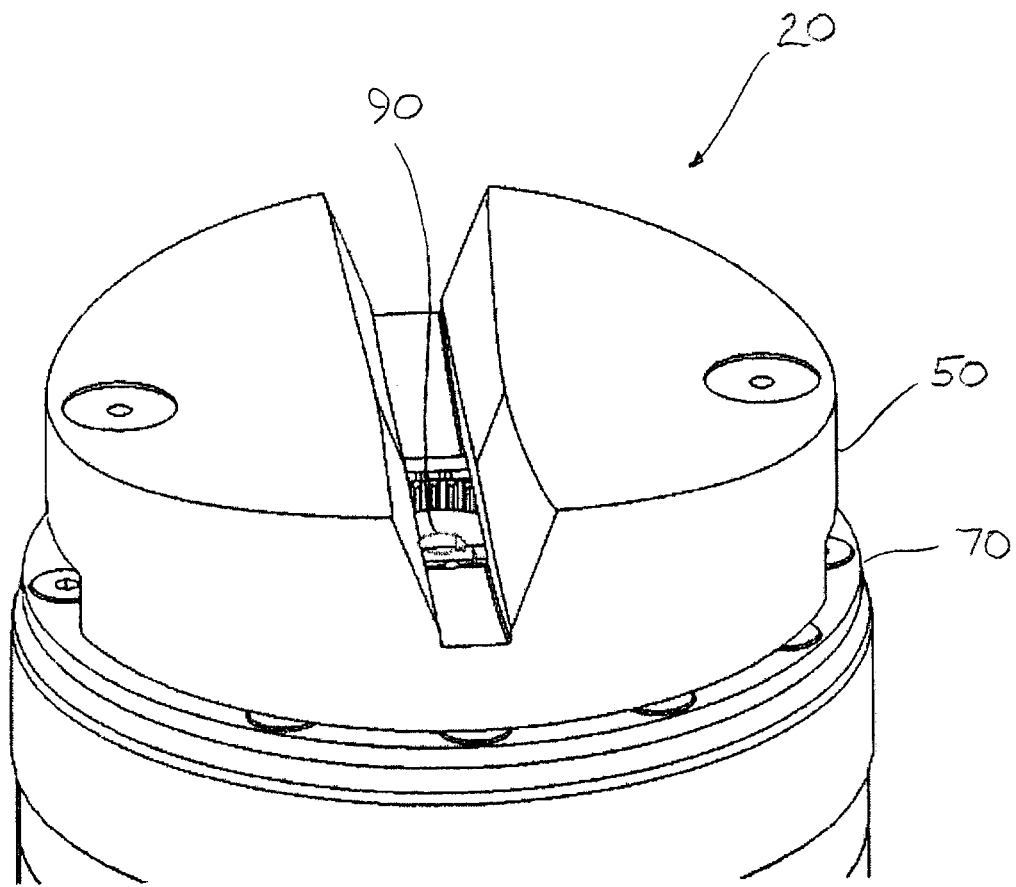
FIG. 16 is a perspective view of the preferred coupling assembly illustrated in FIGS. 1-15 with the eccentric axis plate removed.

Referring now to FIG. 16, a perspective view of preferred coupling assembly 20 is illustrated with eccentric axis plate 30 removed. As shown in FIG. 16, preferred slider plate 50 further comprises one or more slider plate openings 90 adapted to receive fluid.

Figure 17:
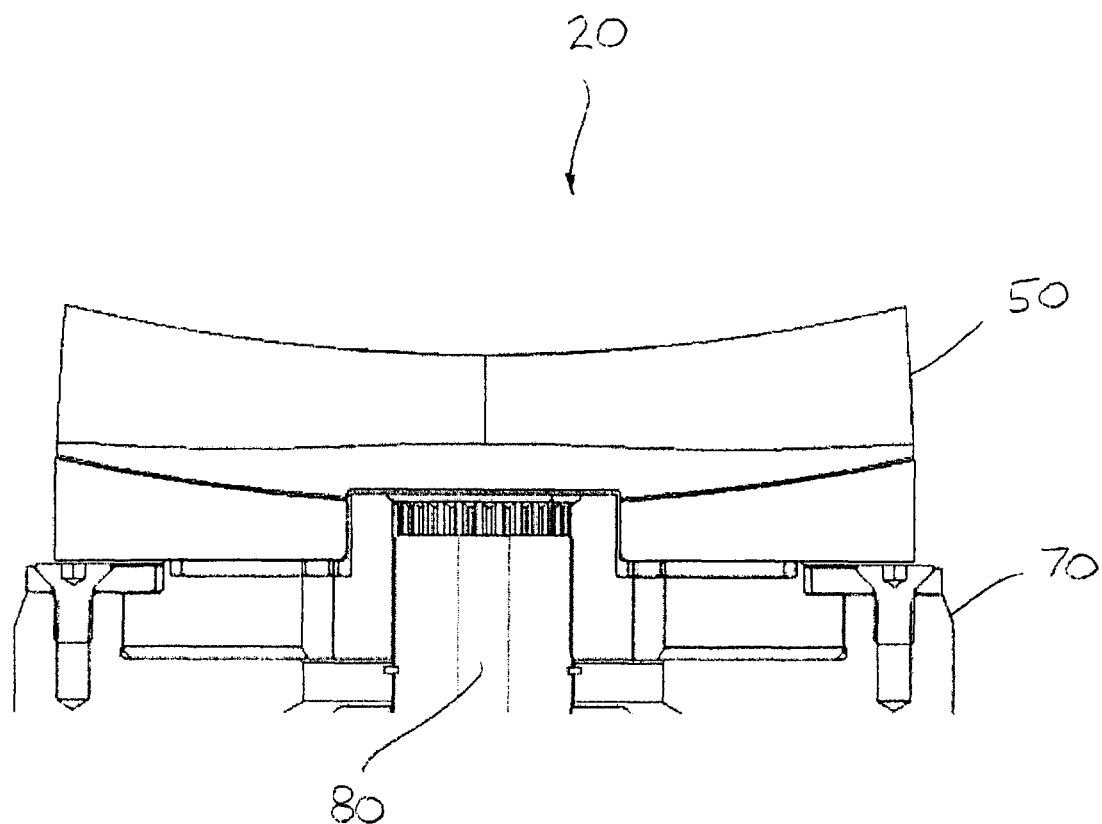
FIG. 17 is a front partial sectional view of the preferred coupling assembly illustrated in FIGS. 1-16 with the eccentric axis plate removed.

Referring now to FIG. 17, a front partial sectional view of preferred coupling assembly 20 is illustrated with eccentric axis plate 30 removed. As shown in FIG. 17, preferred adapter plate 70 comprises one or more adapter plate openings 80 adapted to receive fluid.

Figure 18:
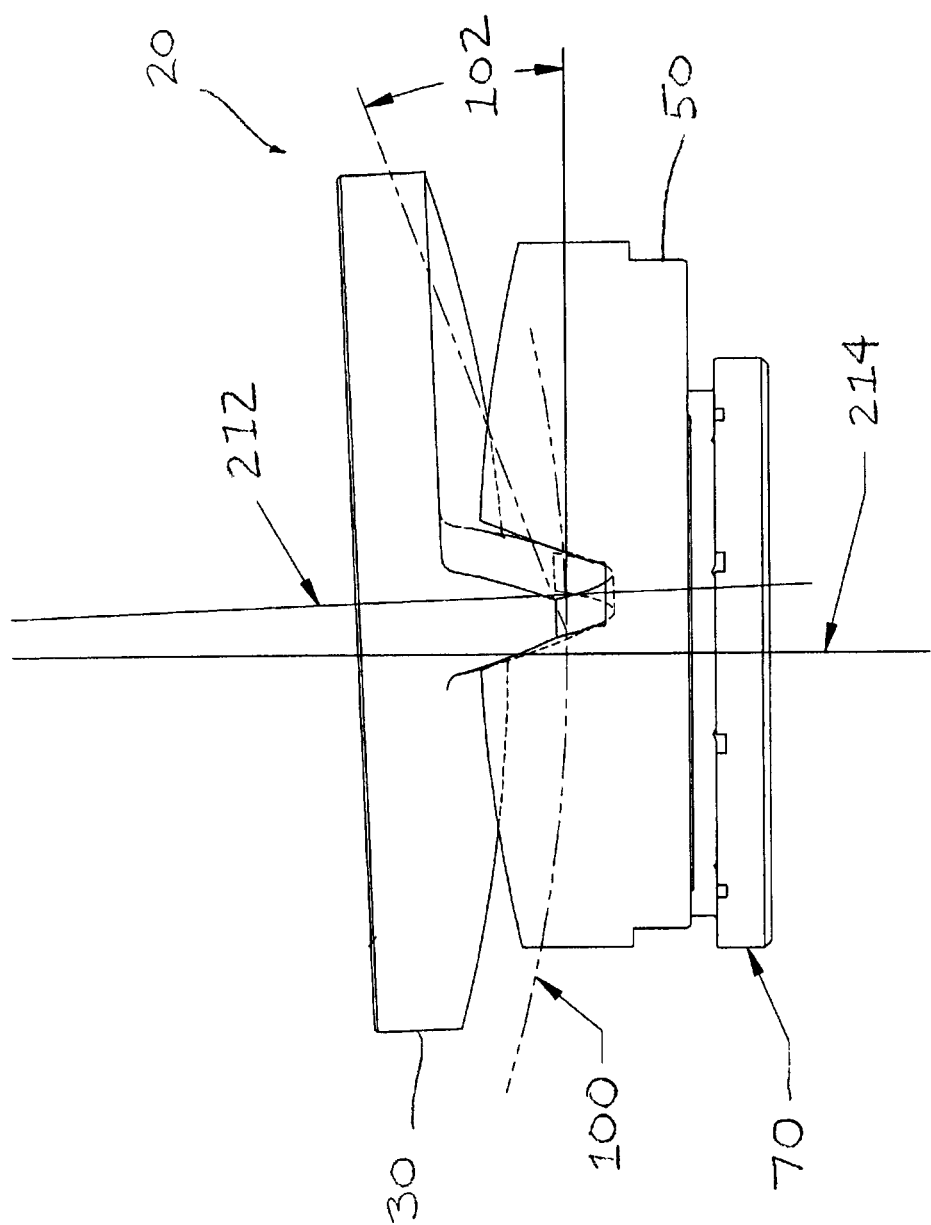
FIG. 18 is a front view of the preferred coupling assembly illustrated in FIGS. 1-17 showing the pressure angle at the pitch circle.

Referring now to FIG. 18, a front view of preferred coupling assembly 20 is illustrated showing the pressure angle at the pitch circle. As shown in FIG. 18, preferred coupling assembly 20 comprises eccentric axis plate 30, drive tang 36, slider plate 50, top groove 54, and adapter plate 70. Preferred eccentric axis plate 30 is concentric to first longitudinal axis 212 and preferred adapter plate 70 is concentric to second longitudinal axis 214. As also shown in FIG. 18, preferred pitch circle 100 defines the maximum radius of drive tang 36 and pressure angle 102 is defined at the pitch circle. Preferably, pressure angle 102 is approximately 20 degrees in order to provide sufficient downward force against slider plate 50 so that the slider plate remains in substantially constant contact with adapter plate 70.

Figure 19:
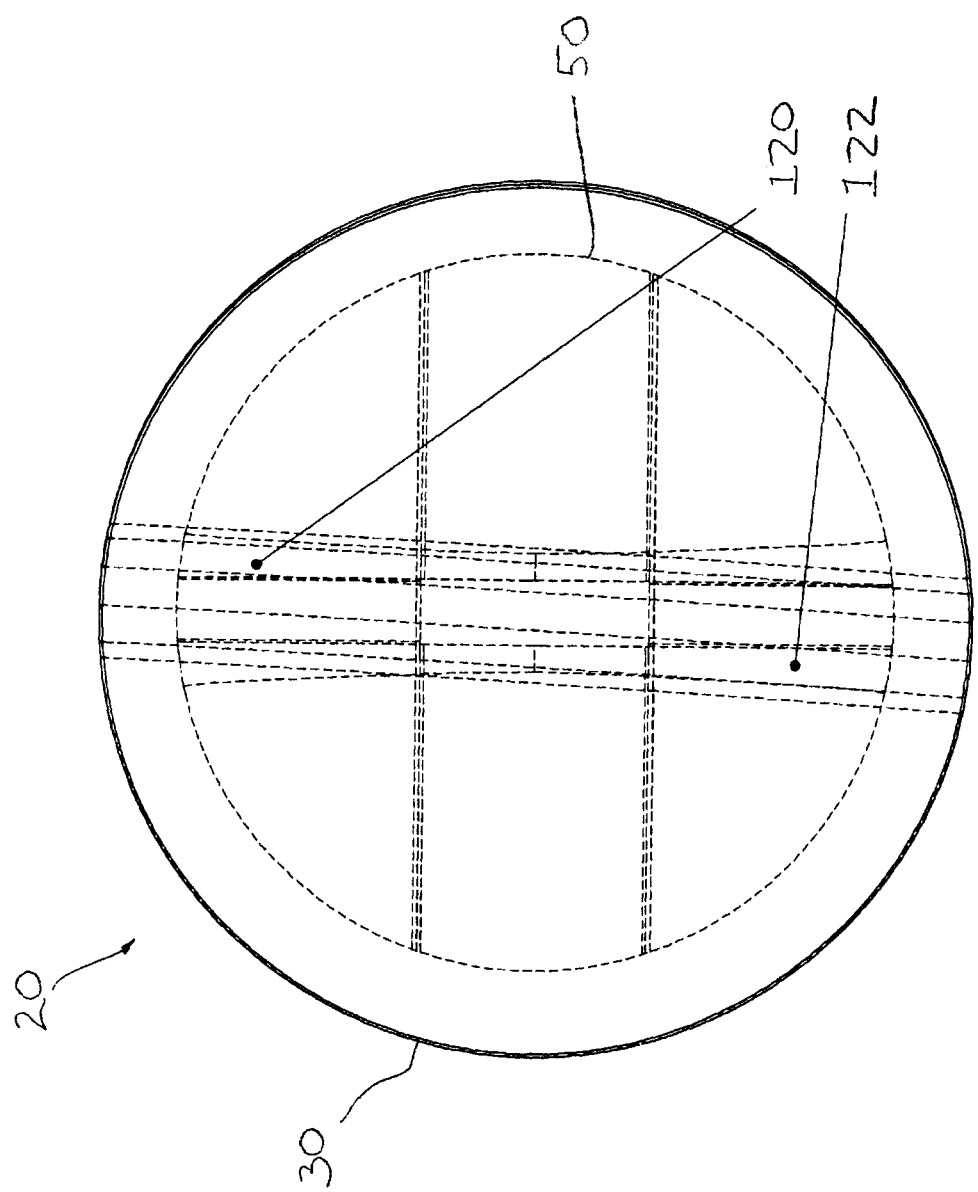
FIG. 19 is a top view of the preferred coupling assembly illustrated in FIGS. 1-18 showing the contacting flanks upon the clockwise rotation of the eccentric axis plate.

Referring now to FIG. 19, a top view of preferred coupling assembly 20 is illustrated showing the contacting flanks upon the clockwise rotation of eccentric axis plate 30. As shown in FIG. 19, preferred coupling assembly 20 comprises eccentric axis plate 30, slider plate 50, and contacting flanks 120 and 122. Preferred contacting flanks 120 and 122 represent the areas in which drive tang 36 of eccentric axis plate 30 contacts top groove 54 of slider plate 50.

Figure 20:
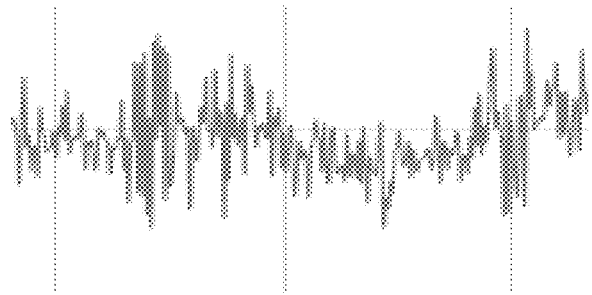
FIG. 20 is a torque graph illustrating the pressure trace for prior coupling assembly testing.

Referring now to FIG. 20, a torque graph from prior coupling assembly testing is random and irregular with sharp torque spikes is illustrated.

Figure 21:
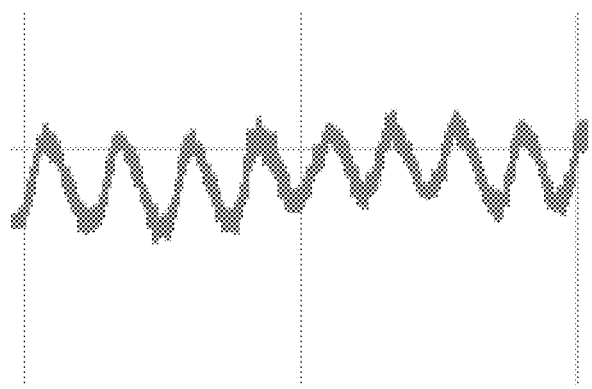
FIG. 21 is a torque graph illustrating the pressure trace for the preferred embodiment of the coupling assembly in accordance with the present invention.

Referring now to FIG. 21, a torque graph from the preferred embodiment of the coupling assembly described and claimed herein having an orderly sine wave trace is illustrated.

The invention also comprises a method for coupling a first component and a second component of an item of equipment. The preferred method comprises providing a coupling assembly adapted for use on an item of equipment having a first component and a second component. The preferred coupling assembly comprises an eccentric axis plate having an eccentric axis plate first surface that is operatively connected to the first component of the item of equipment and an eccentric axis plate second surface that is spaced apart from the eccentric axis plate first surface and has a drive tang extending therefrom. The preferred coupling assembly also comprises a slider plate having a slider plate first surface that is in operational contact with the drive tang of the eccentric axis plate second surface and has a first groove therein and a slider plate second surface that is spaced apart from the slider plate first surface and has a second groove therein. The preferred coupling assembly further comprises an adapter plate having an adapter plate first surface that is in operational contact with the slider plate second surface and has an adapter plate tang extending therefrom and an adapter plate second surface that is spaced apart from the adapter plate first surface and operatively connected to the second component of the item of equipment. In the preferred coupling assembly, the first component has a first longitudinal axis, the second component has a second longitudinal axis, and the first longitudinal axis and the second longitudinal axis are non-parallel. Also in the preferred coupling assembly, the coupling assembly is adapted to couple the first component and the second component of the item of equipment. The preferred method further comprises rotating the first component and the second component of the item of equipment.

In operation, several advantages of the preferred embodiments of the apparatus and method of the invention are achieved. For example, the preferred embodiments of the coupling assembly provide an apparatus and method for a coupling assembly that does not undesirably wear, scuff, or gall the components of an item of equipment or the coupling assembly. The preferred embodiments of the invention claimed herein also provide an apparatus and method for a coupling assembly that does not undesirably reduce the durability or lifespan of the item equipment or the coupling assembly and/or undesirably increase the cost of maintenance, repair, and replacement of the item of equipment and the coupling assembly. The preferred embodiments of the invention claimed herein further provide an apparatus and method for a coupling assembly that is not undesirably unstable in operation or difficult to install, maintain, repair, and remove from the item of equipment. The preferred embodiments of the invention claimed herein still further provide an apparatus and method for a coupling assembly that is not undesirably large and does not permit undesirable rotation during non-crushing operation. In addition, the preferred embodiments of the invention claimed herein provide an apparatus and method for a coupling assembly that tolerates high torque levels (e.g., 2,300 inch-lbs to 30,000 inch-lbs) and/or surface velocities (e.g., 13 inches per second to 18 inches per second) and produces constant torque levels between components of the coupling assembly. The preferred embodiments of the invention claimed herein also provide an apparatus and method for a coupling assembly that maintains constant contact and reduces surface pressure between the components of the assembly and sufficiently lubricates the components of the assembly. The preferred embodiments of the invention claimed herein further provide an apparatus and method for a coupling assembly that is capable of coupling rotating components having non-parallel axes, regardless of whether the non-parallel axes intersect, or rotating components having eccentricity between two or more axes. The preferred embodiments of the invention claimed herein still further provide an apparatus and method for a coupling assembly that may be disposed away from the intersection of two non-parallel axes and accommodate different degrees of angular displacement between non-parallel axes. Additionally, the preferred embodiments of the invention claimed herein provide an apparatus and method for a coupling assembly that is adapted to accommodate components that rotate, oscillate, and/or gyrate. Still further, the preferred embodiments of the invention claimed herein to provide an apparatus and method for a coupling assembly that maintains a constant and equal pressure angle between the contacting flanks of the assembly throughout the complete path of rotation, oscillation, and/or gyration. Further, the preferred embodiments of the invention provide an apparatus and method for a coupling assembly that controls the pressure angle between the drive tang and the groove in order to produce sufficient pressure to maintain contact between the coupling components.

In addition, in operation, the preferred embodiments of the apparatus and method of the invention are adapted to complete the following repeatable 360 degree cycle: (i) at 0 degrees rotation, the eccentric axis plate is disposed in the extreme left position relative to the slider plate and the slider plate is disposed in the centered position relative to the adapter plate; (ii) at 90 degrees rotation, the eccentric axis plate is disposed in the centered position relative to the slider plate and the slider plate is disposed in the extreme forward position relative to the adapter plate; (iii) at 180 degrees rotation, the eccentric axis plate is disposed in the extreme right position relative to the slider plate and slider plate is disposed in the centered position relative to the adapter plate; (iv) at 270 degrees rotation, the eccentric axis plate is disposed in the centered position relative to the slider plate and slider plate is disposed in the extreme right position relative to the adapter plate; and (v) at 360 degrees rotation, the eccentric plate returns to being disposed in the extreme left position relative to the slider plate and the slider plate returns to being disposed in the centered position relative to the adapter plate.

In general, preferred embodiments of the invention can be used in any application requiring two or more non-parallel axes to be coupled. This coupling does not need to be located at an intersection of the coupled axes, nor is it required that the axes be intersecting. In particular, the coupling preferably connects the "normal" or "machine" axis of a cone crusher to its non-parallel "eccentric" crushing axis via a clutch or other braking mechanism. This prevents unwanted head spin when there is no material in the crusher.

Further, the preferred embodiments of the invention are adapted to couple two or more non-parallel axes away from their intersection with a low-profile coupling. More particularly, the base axis adapter plate preferably has a straight tang that mates to the intermediate slider plate's straight slot. The preferred non-parallel eccentric axis plate utilizes an arced involute curved tang that is concentric to the intersection of the axes. Preferably, this tang mates with an arced slot that also has a tapered profile on the slider plate. The contact between the involute tooth or drive tang segment and the mating slot in the slider plate is analogous to the contact between a worm screw and its mating gear. The slots on the slider plate are preferably perpendicular to each other.

By using an involute curve, the preferred coupling assembly maintains a constant and equal pressure angle on both contacting flanks throughout a path of gyration. Preferably, the pressure angle can be manipulated to create enough axial force to keep the slider plate in substantially constant contact with the adapter plate, which ensures full engagement of the adapter plate tang into the slider plate slot.

In addition, the preferred involute curved drive tang significantly minimizes scuffing in the transverse direction based upon the involute tang's contact to its mating slot similar to that of gear teeth. Significantly, test results obtained from a load monitoring device connected to the preferred embodiments of the coupling assembly confirm the stability of the coupling. More particularly, as shown below in FIG. 20, the torque graph from prior coupling assembly testing is random and irregular with sharp torque spikes.

By contrast, the torque graph from the preferred embodiment of the coupling assembly described and claimed herein demonstrates an orderly sine wave trace as shown in FIG. 21.

Unlike previous coupling assembly designs, the preferred arcuate drive tang of the eccentric axis plate maintains substantially constant full contact in the top groove of the slider plate. As a result, a greater surface area of the preferred drive tang of the eccentric axis plate maintains contact with the top groove of the slider plate resulting in reduced surface pressure and component wear.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A coupling assembly adapted for use in coupling together a first component of an item of equipment with a second component of the item of equipment, wherein the first component has a first longitudinal axis, the second component has a second longitudinal axis, and the first longitudinal axis is not parallel to the second longitudinal axis, the coupling assembly comprising:

an eccentric axis plate (EAP) having:
an EAP first surface that is operatively connected to the first component of the item of equipment;

an EAP second surface that is spaced apart from the EAP first surface;
a slider plate having:
   a slider plate first surface;
   a slider plate second surface that is spaced apart from the slider plate first surface;
an adapter plate having:
   an adapter plate first surface;
   an adapter plate second surface that is spaced apart from the adapter plate first surface and that is operatively connected to the second component of the item of equipment;
a first coupling formed between and connecting together the EAP second surface and the slider plate first surface, the first coupling formed by a first tang extending from one of the EAP second surface and the slider plate first surface and a first groove formed in the other one of the EAP second surface and the slider plate first surface, wherein the first tang provides a contacting surface that is sized and configured to engage the first groove; and
a second coupling formed between and connecting together the slider plate second surface and the adaptor plate first surface, the first coupling formed by a second tang extending from one of the slider plate second surface and the adaptor plate first surface and a second groove formed in the other one of the slider plate second surface and the adaptor plate first surface, wherein the second tang provides a contacting surface that is sized and configured to engage the second groove,
wherein the contacting surface of at least one of the first tang and second tang includes an arcuate contacting surface that is an involute curve concentric to an intersection of the first and second longitudinal axes.

2. The coupling assembly of claim 1 wherein the eccentric axis plate comprises an arcuate drive tang contacting surface that is an involute curve concentric to an intersection of the non-parallel first longitudinal axis and the second longitudinal axis.

3. The coupling assembly of claim 1 wherein the drive tang of the eccentric axis plate extends laterally beyond the first groove of the slider plate.

4. The coupling assembly of claim 1 wherein the eccentric axis plate second surface is arcuate.

5. The coupling assembly of claim 1 wherein the eccentric axis plate is adapted to rotate and gyrate.

6. The coupling assembly of claim 1 wherein the slider plate comprises an arcuate first groove contacting surface that is an involute curve concentric to an intersection of the non-parallel first longitudinal axis and the second longitudinal axis.

7. The coupling assembly of claim 1 wherein the slider plate first surface is arcuate.

8. The coupling assembly of claim 1 wherein the slider plate is adapted to oscillate and rotate.

9. The coupling assembly of claim 1 wherein the slider plate further comprises one or more slider plate openings adapted to receive fluid.

10. The coupling assembly of claim 1 wherein the adapter plate is adapted to rotate.

11. The coupling assembly of claim 1 wherein the adapter plate further comprises one or more adapter plate openings adapted to receive fluid.

12. The coupling assembly of claim 1 wherein the eccentric axis plate slidingly moves relative to the slider plate between an extreme left position, a centered position, and an extreme right position along an eccentric axis plate lateral axis.

13. The coupling assembly of claim 12 wherein the slider plate slidingly moves relative to the adapter plate between an extreme forward position, a middle position, and an extreme rearward position along a slider plate lateral axis.

14. The coupling assembly of claim 13 wherein the eccentric axis plate lateral axis is substantially perpendicular to the slider plate lateral axis.

15. The coupling assembly of claim 13 wherein the eccentric axis plate is disposed in one of the extreme left position and the extreme right position when the slider plate is disposed in the middle position.

16. The coupling assembly of claim 13 wherein the eccentric axis plate is disposed in the centered position when the slider plate is disposed in one of the extreme forward position and the extreme rearward position.

17. The coupling assembly of claim 1 wherein the slider plate maintains substantially constant contact with the adapter plate.

18. A coupling assembly adapted for use on rock crusher having an upper rotating shaft and a lower rotating shaft, said coupling assembly comprising:
   an eccentric axis plate, said eccentric axis plate including:
      an eccentric axis plate top surface that is operatively connected to the upper rotating shaft of the rock crusher;
      an eccentric axis plate bottom surface that is spaced apart from the eccentric axis plate top surface and has a drive tang extending therefrom;
   a slider plate, said slider plate including:
      a slider plate top surface that is in operational contact with the drive tang of the eccentric axis plate bottom surface and has a top groove therein;
      a slider plate bottom surface that is space apart from the slider plate top surface and has a bottom groove therein;
   an adapter plate, said adapter plate including:
      an adapter plate top surface that is in operational contact with the slider plate bottom surface and has an adapter plate tang extending therefrom;
      an adapter plate bottom surface that is spaced apart from the adapter plate top surface and operatively connected to the lower rotating shaft of the rock crusher;
   wherein the upper rotating shaft has a first longitudinal axis; and wherein the lower rotating shaft has a second longitudinal axis; and wherein the first longitudinal axis and the second longitudinal axis are non-parallel; and wherein the coupling assembly is adapted to couple the upper rotating shaft and the lower rotating shaft; and wherein the drive tang of eccentric axis plate and the top groove of the slider plate comprise an involute arc that is concentric to an intersection of the non-parallel first longitudinal axis and the second longitudinal axis.

19. The coupling assembly of claim 18 wherein the slider plate maintains substantially constant contact with the adapter plate.

20. A method for coupling together a first component of an item of equipment with a second component of the item of equipment, wherein the first component has a first longitudinal axis, the second component has a second longitudinal axis, and the first longitudinal axis is not parallel to the second longitudinal axis, the method comprising the steps of:

providing a coupling assembly comprising:
- an eccentric axis plate (EAP) having an EAP first surface and an EAP second surface that is spaced apart from the EAP first surface;
- a slider plate having a slider plate first surface and a slider plate second surface that is spaced apart from the slider plate first surface;
- an adapter plate having an adapter plate first surface and an adapter plate second surface that is spaced apart from the adapter plate first surface;

connecting the EAP first surface to the first component of the item of equipment;

connecting the adapter plate second surface to the second component of the item of equipment;

forming a first coupling to connect the EAP second surface and the slider plate first surface, the first coupling formed by a first tang extending from one of the EAP second surface and the slider plate first surface and a first groove formed in the other one of the EAP second surface and the slider plate first surface, wherein the first tang provides a contacting surface that is sized and configured to engage the first groove;

forming a second coupling to connect the slider plate second surface and the adaptor plate first surface, the second coupling formed by a second tang extending from one of the slider plate second surface and the adaptor plate first surface and a second groove formed in the other one of the slider plate second surface and the adaptor plate first surface, wherein the second tang provides a contacting surface that is sized and configured to engage the second groove, wherein the contacting surface of at least one of the first tang and second tang includes an arcuate contacting surface that is an involute curve concentric to an intersection of the first and second longitudinal axes; and rotating the first component and the second component of the item of equipment using the coupling assembly.

* * * * *